United States Patent
Chan

(10) Patent No.: US 7,269,710 B1
(45) Date of Patent: Sep. 11, 2007

(54) PROGRAM MEMORY SPACE EXPANSION FOR PARTICULAR PROCESSOR INSTRUCTIONS

(75) Inventor: Stephen H. Chan, Los Altos Hills, CA (US)

(73) Assignee: ZiLOG, Inc., San Jose, CA (US)

( * ) Notice: Subject to any disclaimer, the term of this patent is extended or adjusted under 35 U.S.C. 154(b) by 489 days.

(21) Appl. No.: 10/898,704

(22) Filed: Jul. 23, 2004

(51) Int. Cl.
*G06F 9/26* (2006.01)

(52) U.S. Cl. .................. 711/219; 711/203; 711/206; 711/208; 711/209; 711/220

(58) Field of Classification Search ............... 711/219
See application file for complete search history.

(56) References Cited

U.S. PATENT DOCUMENTS

| | | | |
|---|---|---|---|
| 6,401,196 B1 | 6/2002 | Lee et al. | 712/241 |
| 6,643,760 B2 * | 11/2003 | Troutman et al. | 711/212 |
| 6,691,219 B2 * | 2/2004 | Ma et al. | 711/219 |
| 6,728,856 B2 | 4/2004 | Grosbach et al. | 711/202 |
| 7,007,194 B1 * | 2/2006 | Wilson et al. | 714/6 |
| 2002/0156991 A1 * | 10/2002 | Ma et al. | 711/219 |

* cited by examiner

*Primary Examiner*—Hyung Sough
*Assistant Examiner*—Hamdy S Ahmed
(74) *Attorney, Agent, or Firm*—Imperium Patent Works; Darien K. Wallace; T. Lester Wallace

(57) ABSTRACT

A system efficiently expands program memory without extensively modifying the remaining microcontroller architecture. An address bus of N+M bits addresses $2^N$ memory locations in a regular portion of program memory and additional memory locations in an expanded portion. An N-bit program counter increments through instructions stored only in the regular portion. Constants are stored in both the regular and expanded portions. An M-bit page-designator is prepended to an N-bit operand to generate a memory address of N+M bits. Program memory is expanded only when a load instruction retrieves constants from program memory. The page-designator is toggled when an N-bit operand rolls over upon incrementing by the load instruction. A block of constants straddling the boundary between the regular and expanded portions can be retrieved from program memory by executing only the load instruction. When program instructions are executed that do not retrieve constants, a fixed page-designator designates the regular portion.

32 Claims, 7 Drawing Sheets

PROGRAM MEMORY SPACE EXPANSION FOR PARTICULAR PROCESSOR INSTRUCTIONS

TECHNICAL FIELD

The present invention relates generally to computer architectures and, more specifically, to a microcontroller architecture for expanding program memory.

BACKGROUND

Remote control devices are typically supplied along with consumer appliances, such as televisions, radio tuners, digital video disk players, video cassette recorders, set-top cable television boxes, set-top satellite boxes, etc. The remote control devices control the associated consumer appliances by sending infrared signals with key codes to the consumer appliances. Each such key code corresponds to a function of the selected consumer appliance, such as power on, volume down, play, stop, select, channel advance, channel back, etc. The key codes for all of the functions of a particular consumer appliance together comprise a codeset. Codesets can differ from each other not only by the bit patterns assigned to the key codes, but also by the number of bits per key code, the width of the bit pulses, the frequency of the bit pulses, as well as by the frequency of the operational signal over which the bit pulses are modulated.

In order to avoid the situation where a signal containing a key code operates a consumer appliance that is not selected, different codesets are used for different appliances. Although each model of consumer appliance might not have a unique codeset, there are nevertheless thousands of codesets used to operate the various types, brands and models of consumer appliances sold in the world market today.

Some remote control devices are sold separately from consumer appliances and are preloaded with codesets that operate numerous types, brands and models of consumer appliances. These separately sold remote control devices are sometimes called "universal" remote control devices. The potential market for a universal remote control device is larger the more codesets can be loaded onto the remote control device. There is a cost, however, of providing a remote control device with additional memory in which to store additional codesets. The cost of a remote control device that can store additional codesets, however, can be reduced by more efficiently using the existing memory on the remote control device, such as the read only memory (ROM) of a microcontroller integrated circuit. For example, codesets can be stored in ROM program memory of the Z8 microcontroller available from Zilog, Inc. of San Jose, Calif.

A microcontroller architecture is sought that allows program memory to be expanded such that codesets can be efficiently stored in program memory and expanded program memory.

SUMMARY

A method allows program memory in a microcontroller to be expanded without requiring extensive modifications to the remaining microcontroller architecture. Constants are stored in both a regular portion and an expanded portion of program memory, whereas program instructions are stored only in the regular portion. The regular portion has up to $2^N$ unique memory locations. Program memory is expanded only when the microcontroller processor executes a load instruction that retrieves constants from program memory. An M-bit page-designation value is prepended to an N-bit operand indicative of a memory location to generate a memory address of N+M bits. Memory addresses of N+M bits are output over an address bus of N+M bits to address more than $2^N$ memory locations. The M-bit page-designation value is toggled when the N-bit operand that has been incremented by the load instruction rolls over. A block of constants that straddles the boundary between the regular and expanded portions of program memory can be loaded from program memory into random access memory (RAM) using only the load instruction.

A program counter outputs an N-bit value indicative of the memory location of a program instruction. When a program instruction is being executed that does not retrieve constants from program memory, a fixed M-bit page-designation value is prepended to the N-bit value to generate a memory address of N+M bits. The fixed M-bit page-designation value designates the regular portion of program memory in which program instructions are stored.

A system for expanding program memory includes program memory, an address bus that is N+M bits wide and addresses the program memory, a program counter that is N bits wide, a register file memory and a multiplexer. The memory space comprises a regular portion and an additional portion, wherein the regular portion has up to $2^N$ unique memory locations. The regular portion contains both program instructions and constants, whereas the additional portion contains only constants. The register file memory comprises a source register pair and a memory page register.

The multiplexer has a first data input lead, a second data input lead and an output lead, each of which is N+M bits wide. A page bit of the memory page register is coupled to the most significant bit of the first data input lead. The source register pair is coupled to the N least significant bits of the first data input lead. A fixed digital value is present on the most significant bit of the second data input lead. The program counter is coupled to the N least significant bits of the second data input lead. The address bus is coupled to the output lead. When a first program instruction is being executed that retrieves constants from the memory space, the multiplexer couples the first data input lead to the output lead. The first program instruction has a source operand that identifies an address of the source register pair. When a second program instruction is being executed that does not retrieve constants, the multiplexer couples the second data input lead to the output lead, and the address bus addresses only the regular portion of the memory space.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
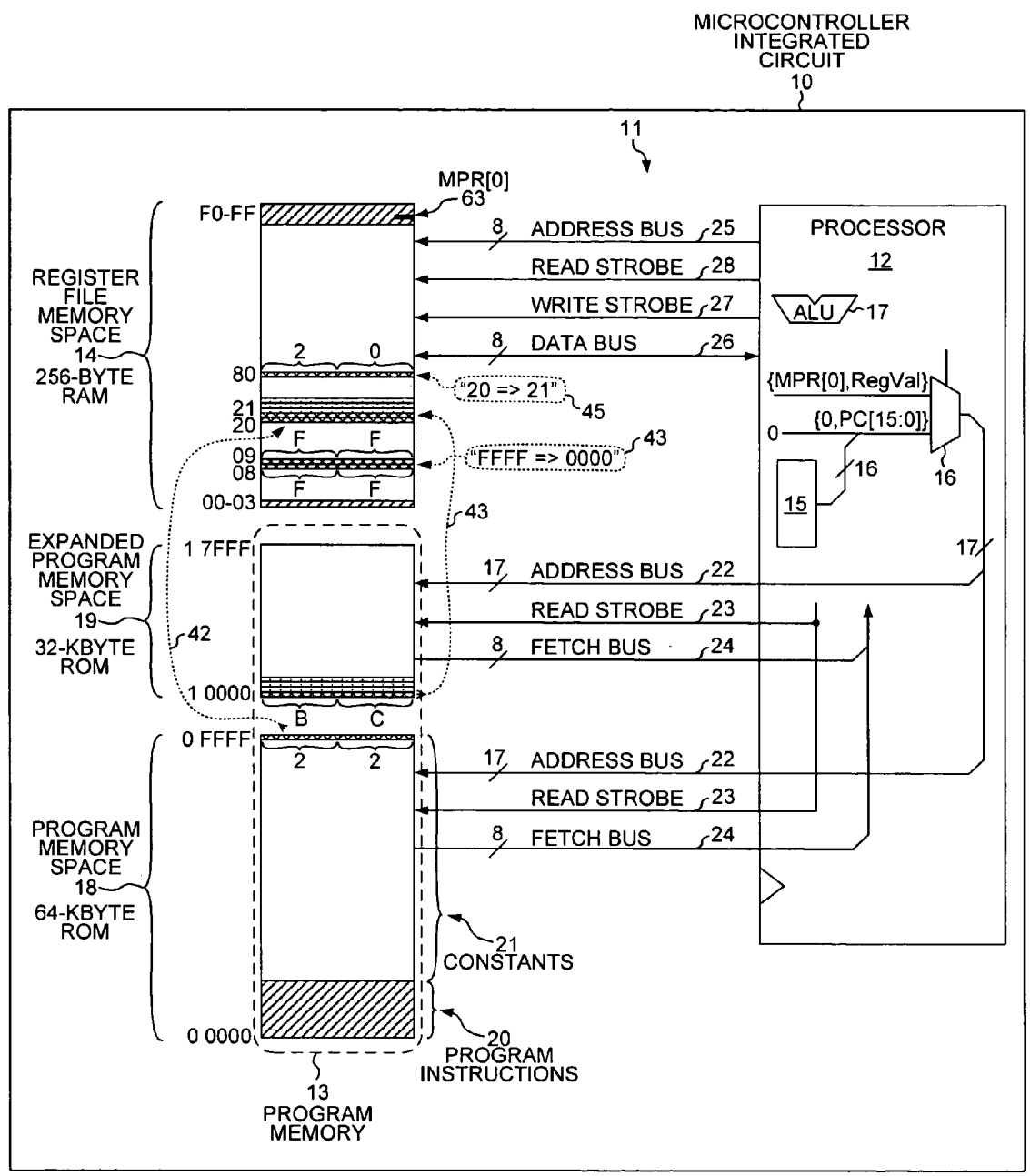
FIG. 1 is a simplified schematic diagram of a microcontroller with a system for expanding program memory.

FIG. 1 shows a microcontroller integrated circuit 10 with a system 11 for expanding program memory only when particular processor instructions are executed. Microcontroller 10 includes a processor 12, a program memory 13 and a register file memory space 14. Processor 12 includes a 16-bit program counter 15, a multiplexer 16 and an 8-bit arithmetic and logic operation unit (ALU) 17. Program memory 13 includes a program memory space 18 and an expanded program memory space 19. In this example, program memory 13 is read only memory referred to as ROM. In other examples, program memory 13 can be another type of read only memory such as PROM, EPROM, FLASH and E²PROM. Program memory space 18 is a 64-kbyte ROM. Register file memory space 14 is a 256-byte random access memory (RAM) and functions as a data memory. Microcontroller 10 can manipulate data in 256-byte register file memory space 14 faster than data in a typical data memory that is much larger, for example, sixty-four kilobytes. Microcontroller 10 has a Harvard architecture, and processor 12 can simultaneously communicate with both program memory 13 containing program instructions and register file memory space 14 containing data. Both program instructions 20 and constants 21 are stored in program memory space 18, whereas only constants 21 are stored in expanded program memory space 19.

In this embodiment, microcontroller 10 is part of a remote control device that controls multiple consumer appliances. Processor 12 is used to generate infrared signals with key codes that control functions of the selected consumer appliances. The microcode that runs on processor 12 can be stored in a relatively small amount of memory, for example, in less than twenty-four kilobytes. The remainder of program memory space 18 can be used to store codesets for multiple consumer appliances. The remainder of the 64-kbyte program memory space 18, however, may not be sufficient to store all of the thousands of codesets for the various types, brands and models of consumer appliances in the market. Therefore, 32-kbyte expanded program memory space 19 has been added to microcontroller 10 to store more codesets than fit into program memory space 18. System 11 allows program memory 13 to be expanded without requiring extensive and expensive modifications to microcontroller 10. System 11 allows processor 12 to access expanded program memory space 19 only when executing a particular type of processor instruction that retrieves constants from program memory 13. In other embodiments, expanded program memory space 19 is larger than thirty-two kilobytes. In yet other embodiments, multiple expanded memory spaces are added to program memory 13.

Each memory location in program memory space 18 contains one byte and has a memory address that corresponds to a 16-bit value from 0000H to FFFFH, where the "H" denotes a hexadecimal value. Thus, program memory space 18 has $2^{16}$ unique memory locations. In this example, expanded program memory space 19 has $2^{15}$ unique memory locations, each with a memory address that corresponds to a 16-bit value from 0000H to 7FFFH. Each 16-bit value from 0000H to 7FFFH corresponds to a memory location in both program memory space 18 and expanded program memory space 19. System 11 provides an instruction-dependent page addressing scheme that prepends a 1-bit page-designation value to each 16-bit value to distinguish memory locations in program memory space 18 from those memory locations in expanded program memory space 19 that correspond to the same 16-bit value. System 11 generates 17-bit memory addresses by prepending the 1-bit values to the 16-bit values.

Processor 12 reads from program memory space 13 by supplying a 17-bit memory address of a particular memory location onto a 17-bit address bus 22 and then outputting a read strobe signal onto a read strobe line 23. When program memory space 13 detects the address of the particular memory location on address bus 22 at the same time that the read strobe signal is present on read strobe line 23, program memory space 13 outputs the constant or program instruction contained in the particular memory location onto a fetch bus 24.

To write to register file memory space 14, processor 12 outputs the memory address of a particular memory location onto an 8-bit address bus 25. Then processor 12 outputs data to be written into the memory location onto an 8-bit data bus 26 and outputs a write strobe signal onto a write strobe output line 27. Processor 12 reads from register file memory space 14 by supplying the memory address of a particular memory location onto address bus 25 and then outputting a read strobe signal onto a read strobe line 28. When register file memory space 14 detects the address of the particular memory location on address bus 25 at the same time that the read strobe signal is present on read strobe line 28, register file memory space 14 outputs the contents of the particular memory location onto data bus 26.

Whereas program instructions 20 and constants 21 are typically stored in program memory space 13, variable data, such as ALU operands, are typically stored in register file memory space 14. Nevertheless, certain functions of programs that are compiled to run on microcontroller 10 can be performed only if all of the pointers of the function point to memory locations in RAM. Thus, constants 21 are loaded into RAM, in this case register file memory space 14, so that certain functions can be performed using constants 21 together with the ALU operands. When the program functions are compiled to run on microcontroller 10, the compiler generates program instructions to copy constants 21 from ROM program memory 13 into RAM register file memory space 14. For example, the two program instructions on the Z8 microcontroller from Zilog, Inc. that load constants from program memory 13 into register file memory space 14 are LDC (Load Constant) and LDCI (Load Constant Auto-Increment).

Figure 2A:
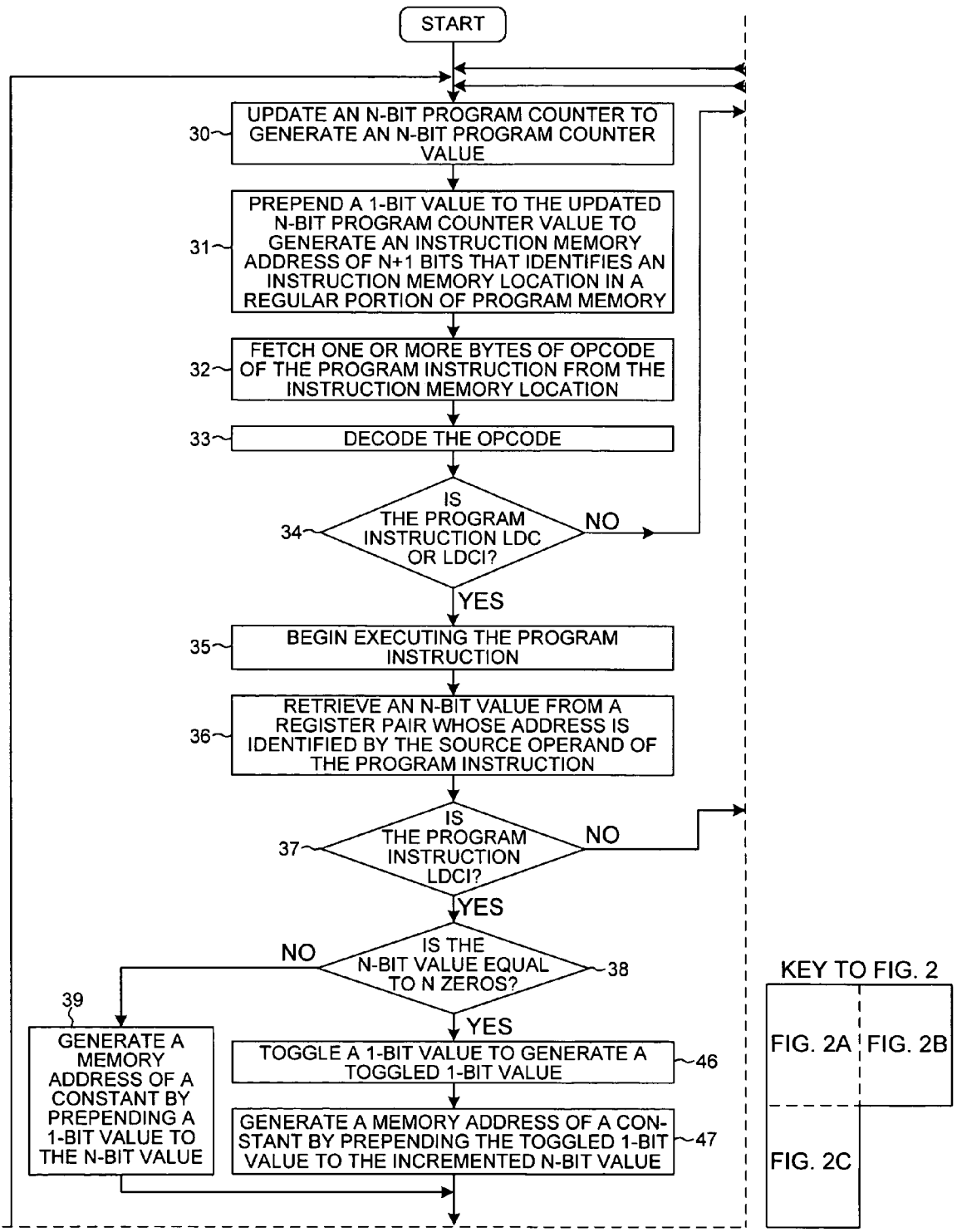
FIGS. 2A-C make up a flowchart of steps for expanding program memory when particular processor instructions are executed.
Figure 2B:
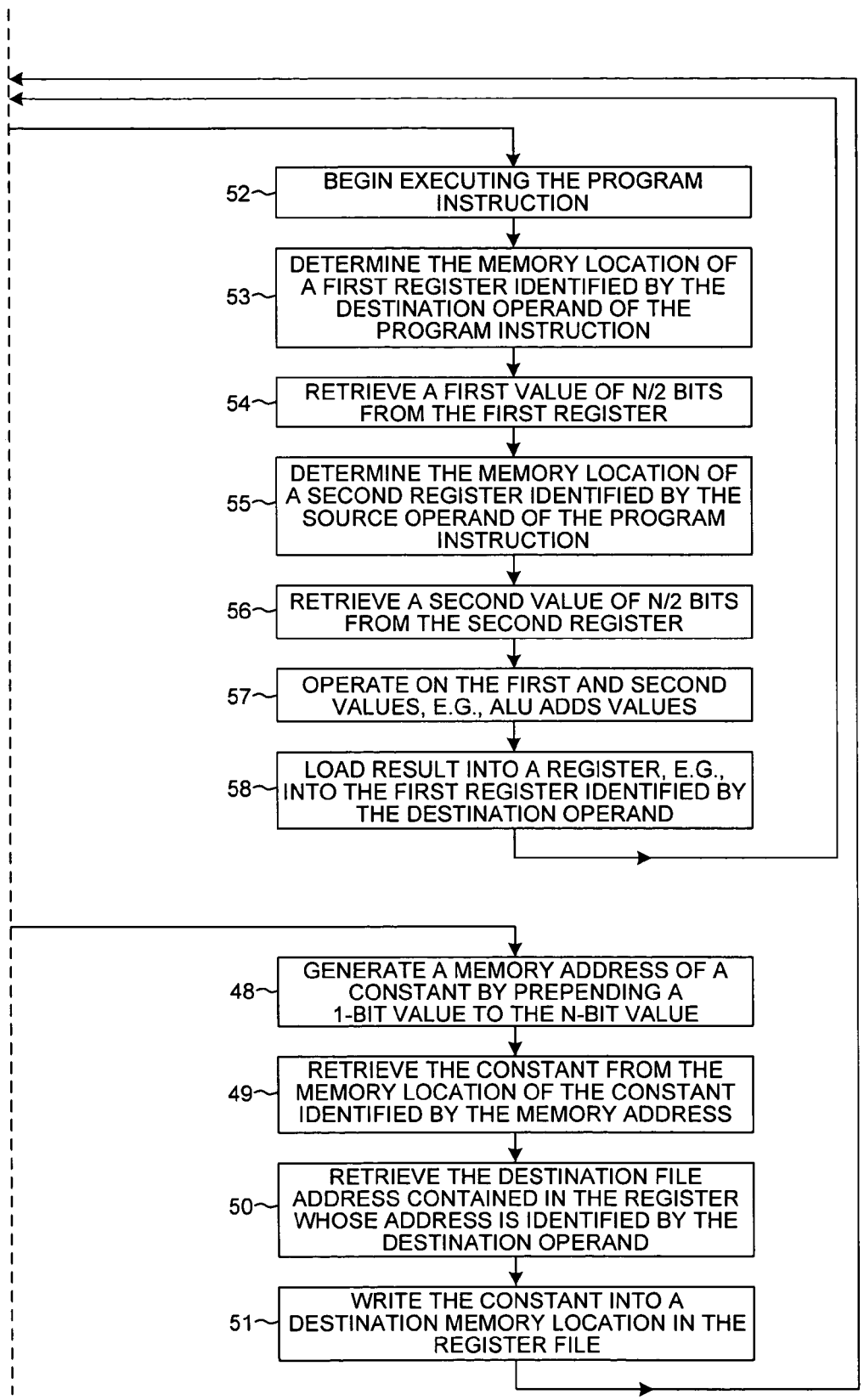
Figure 2C:
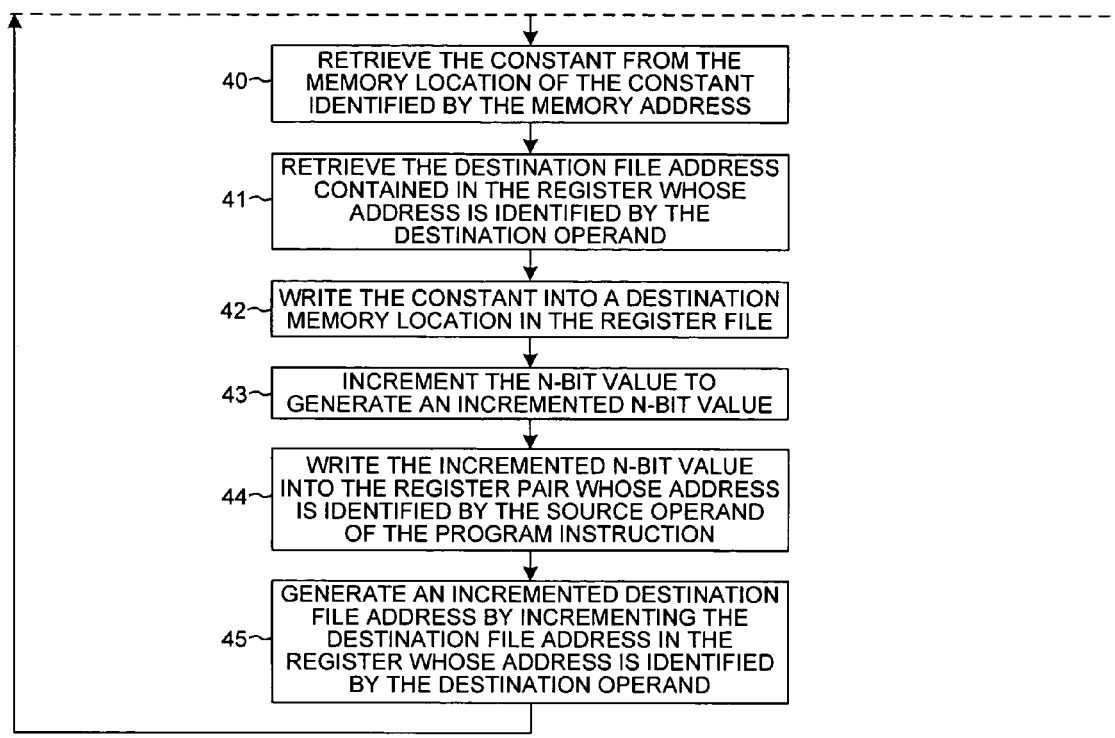

FIGS. 2A-C show a flowchart illustrating steps 30-58 of a method by which expanded program memory space 19 is accessed only when processor 12 executes particular program instructions that retrieve constants from program memory 13. The steps of FIGS. 2A-C are now described as system 11 of FIG. 1 selectively expands program memory 13 depending on which of three sample program instructions is being executed. Instruction-dependent page addressing of program memory space 18 and expanded program memory space 19 is described in relation to the instructions LDC and LDCI that retrieve constants from program memory 13, as well as in relation to the instruction ADD that does not retrieve any constant from program memory 13.

In an initial step 30, 16-bit program counter 15 is updated to generate a 16-bit program counter value. In a step 31, a 1-bit page-designation value is prepended to the updated 16-bit program counter value.

Figure 3:
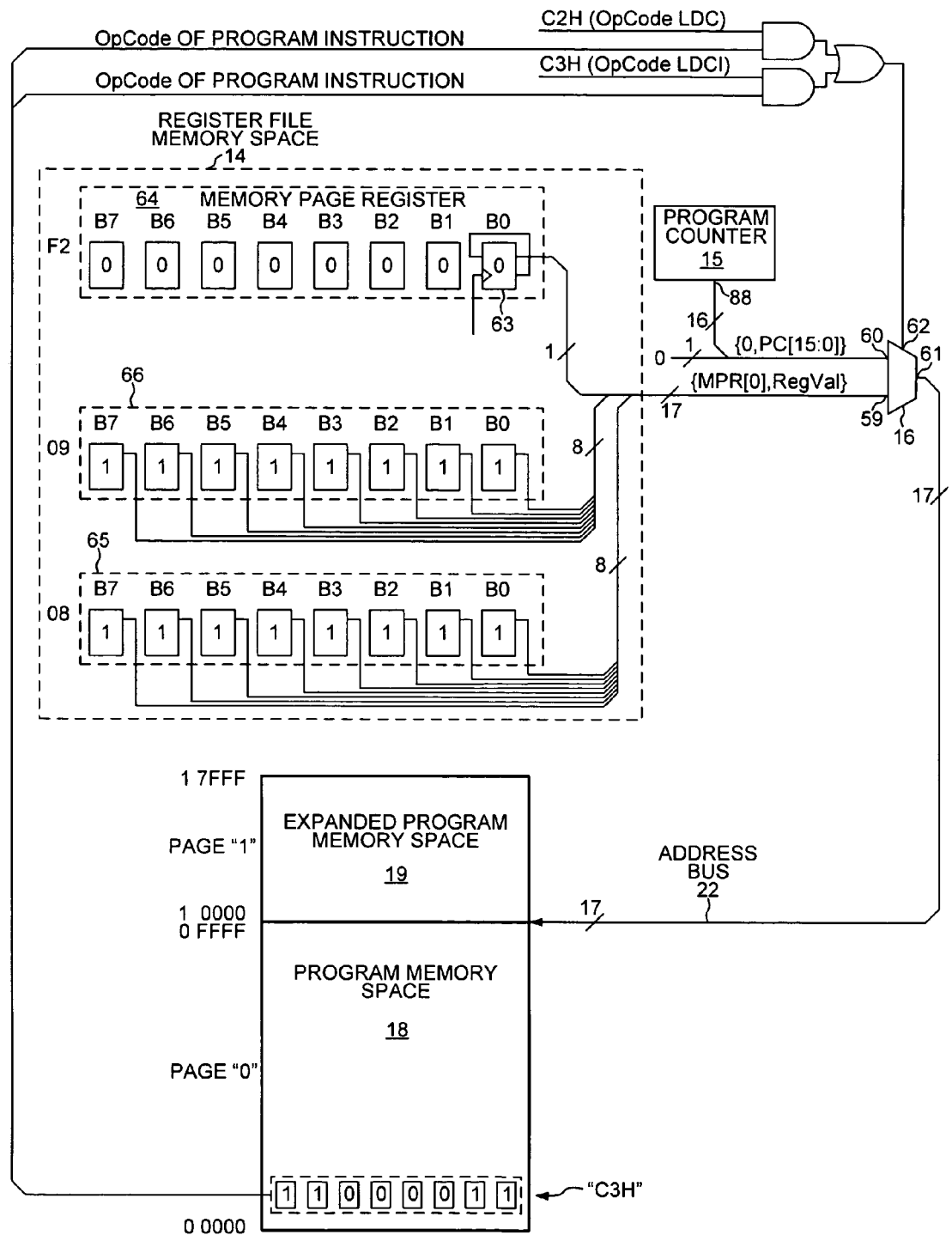
FIG. 3 is a more detailed schematic diagram of components of the system of FIG. 1.

FIG. 3 is a more detailed diagram of system 11 showing multiplexer 16 coupled to program counter 15, address bus 22 and to various registers. In the embodiment of system 11 shown in FIG. 3, the 1-bit page-designation value that is prepended in step 30 to the updated 16-bit program counter value is always zero. Thus, the 1-bit value designating program memory space 18 is zero, and the 1-bit value for expanded program memory space 19 is one. In other embodiments, the digital values of the page designation values can be reversed for program memory space 18 and expanded program memory space 19.

FIG. 3 shows that multiplexer 16 has a first data input lead 59, a second data input lead 60, an output lead 61 and a select input lead 62. Each of first data input lead 59, second data input lead 60 and output lead 61 is seventeen bits wide. Output lead 61 is coupled to address bus 22. Program counter 15 is coupled to the sixteen least significant bits of second data input lead 60.

In a step 32, processor 12 fetches the machine language code (called an "OpCode") stored in the memory location in program memory space 18 corresponding to the 17-bit address resulting from prepending a zero to the updated 16-bit program counter value. Multiplexer 16 couples first data input lead 59 to output lead 61 when one of the two program instructions LDC and LDCI that load constants from program memory 13 is being executed. At this point, neither LDC nor LDCI is being executed, so multiplexer 16 couples second data input lead 60 to output lead 61. (Some other program instruction is being executed at this point.) Thus, multiplexer 16 outputs a 17-bit value whose most significant bit is zero at all times when processor 12 is not executing either of the program instructions LDC or LDCI.

In this example, the OpCode of a program instruction can be one, two or three bytes wide. Where the OpCode is more than one byte wide, step 32 is performed in more than one substep because each memory location in program memory space 18 described by a 17-bit value contains one byte of data. In other examples, a program instruction can also include an operand in addition to the OpCode.

In a step 33, the OpCode is decoded. In this example, the first program instruction that is fetched is the instruction with the assembler code "LDCI @80H @08H" and the OpCode "C3 80 08". In a decision step 34, it is determined that the fetched OpCode corresponds to one of the two program instructions LDC and LDCI that loads constants from program memory 13. In a next step 35, processor 12 begins executing the LDCI program instruction.

In a step 36, processor 12 retrieves a 16-bit value from a register pair in register file memory space 14 whose address is identified by the source operand of the first program instruction. For the hexidecimal OpCode "C3 80 08", 80H is the destination operand, and 08H is the source operand. The source operand 08H identifies the register pair at memory locations 08H and 09H in register file memory space 14. In this example, the 16-bit value FFFFH is retrieved from the register pair 08H, as illustrated in FIGS. 1 and 3.

Figure 4:
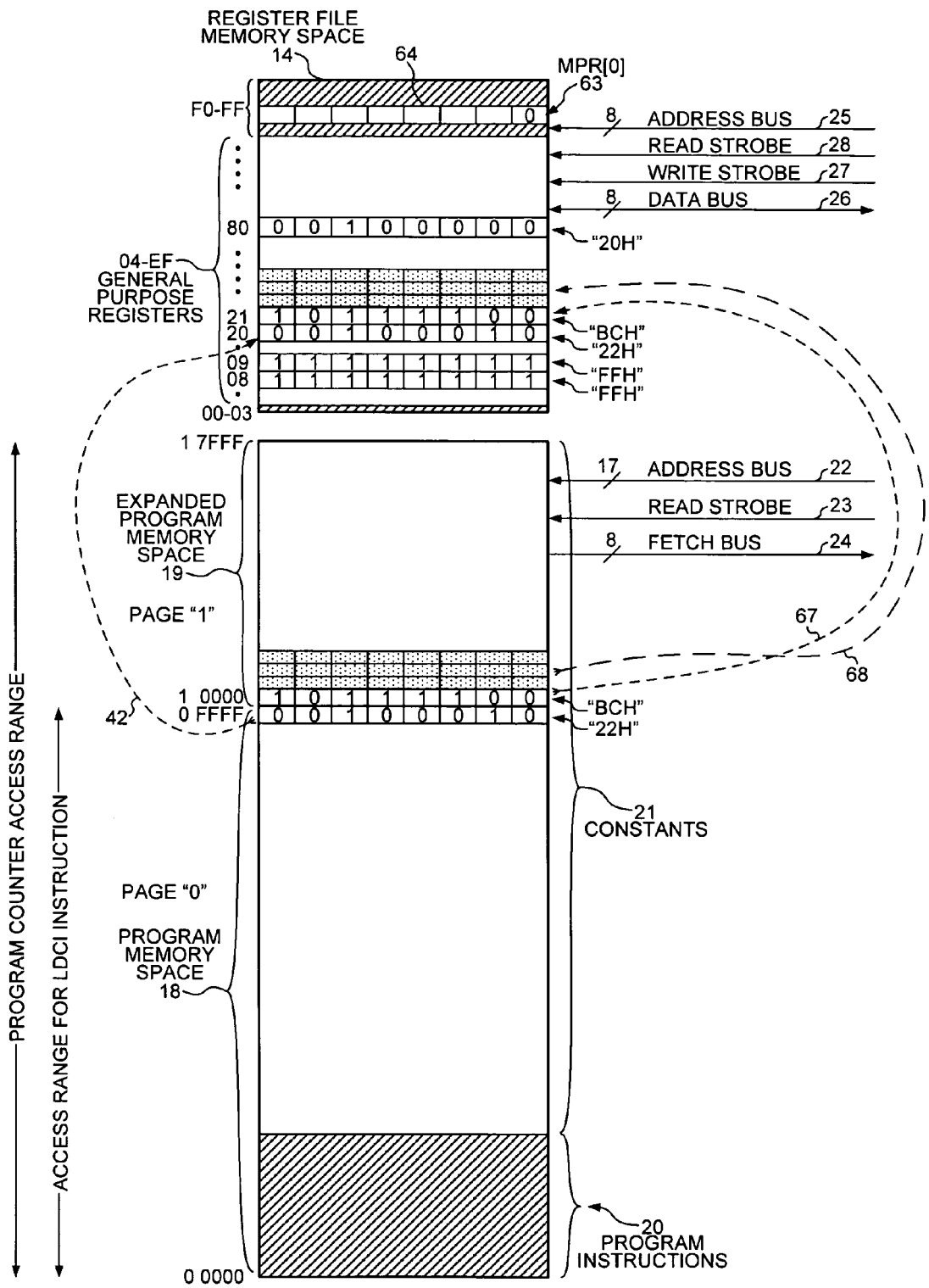
FIG. 4 is a more detailed diagram of program memory and register file memory space within the system of FIG. 1.

FIG. 4 is a schematic diagram of program memory 13 and register file memory space 14 showing the memory locations and registers in more detail. FIG. 4 shows that the 16-bit value FFFFH in register pair 08H is stored as FFH in register 08H and as FFH in register 09H. FIG. 4 also shows the four registers 00H through 03H of register file memory space 14 that serve as input/output ports. In addition, sixteen registers F0H through FFH function as CPU control registers. Constants can be loaded into the 236 general purpose registers 04H through EFH of register file memory space 14. The register pair 08H falls within the general purpose registers.

In a decision step 37, it is determined that the fetched OpCode corresponds to the program instruction LDCI. In a decision step 38, it is determined that the 16-bit value FFFFH in register pair 08H does not equal sixteen zeros (0000H).

In a step 39, system 11 generates a 17-bit memory address of a first constant by prepending a 1-bit page-designation value to the 16-bit value FFFFH. The 1-bit value is located in a page bit of a memory page register within the CPU control registers F0H through FFH of register file memory space 14.

FIG. 3 shows a page bit 63 (MPR[0]) of an 8-bit memory page register 64 located at memory location F2H of register file memory space 14. In embodiments that add multiple expanded memory spaces to program memory 13, multi-bit page-designation values are stored in multiple bits of memory page register 64. Memory page register 64 uses one of the control registers otherwise allocated for control of a timer/counter of microcontroller 10. For additional information on the allocation of registers within register file memory space 14 and on program instructions including LDC, LDCI and ADD, see the manual entitled "Z8 Microcontrollers User's Manual," by Zilog, Inc., Q2/97 UM97Z8X0104, which is hereby incorporated by reference. FIG. 3 also shows that register 08H (65) and register 09H (66) of the register pair identified by the source operand are coupled to bits [7:0] and [15:8] of first data input lead 59, respectively.

Page bit 63 of memory page register 64 is coupled to the most significant bit of first data input lead 59. Upon powerup of microcontroller 10 as well as after reset, page bit 63 is set to zero. Because system 11 detects the OpCode C3H for LDCI, a signal is asserted on select input lead 62 of multiplexer 16 that couples first data input lead 59 to output lead 61. Thus, multiplexer 16 outputs a 17-bit memory address of "0 FFFFH" in step 39.

In a step 40, the first constant is retrieved from the memory location identified by the memory address "0 FFFFH" generated in step 39. In this example, the first constant is 22H, as shown in FIG. 4.

In a step 41, processor 12 retrieves the destination file address from the register whose address is identified by the destination operand 80H of the first program instruction. FIG. 4 illustrates that the destination file address 20H is contained in the register 80H of the register file memory space 14.

In a step 42, the first constant 22H is written into a destination memory location identified by the destination file address 20H.

In a step 43, the 16-bit value FFFFH in register pair 08H is incremented to generate an incremented 16-bit value. In one embodiment, 8-bit ALU 17 performs the incrementing in step 43. In another embodiment, the 16-bit value can be placed in a predetermined register and incremented automatically in hardware such that the bits of the register form a small counter. In this example, where the 16-bit value is FFFFH, incrementing in step 43 is performed such that the 16-bit value FFFFH rolls over to 0000H, as illustrated in FIG. 1.

In a step 44, processor 12 writes the incremented 16-bit value 0000H into register pair 08H, whose address is identified by the source operand 08H of the first program instruction.

In a step 45, the destination file address located in the register identified by the destination operand 80H is incremented, generating an incremented destination file address. In this example, the incremented destination file address is 21H, as illustrated in FIG. 1.

The execution of the first program instruction is now complete, and processor 12 can now execute another instruction. Returning to step 30 a second time in this example, program counter 15 is updated by incrementing the 16-bit program counter value. In another example, program counter 15 can be updated by jumping back to the original 16-bit program counter value a predetermined number of times.

In step 31, a zero is prepended to the incremented 16-bit program counter value to generate a memory address of an additional program instruction. In step 32, processor 12 fetches the OpCode located in the next memory location of program memory space 18. In step 33, the OpCode is decoded. In this example, the OpCode located in the next memory location is again "C3 80 08" and corresponds to the assembler code "LDCI @80H @08H". Thus, the multiple use of the program instruction LDCI is being used to perform a "block move" or "table copy" operation.

In decision step 34, it is again determined that the OpCode corresponds to one of the program instructions LDC or LDCI. In step 35, processor 12 again begins executing the program instruction with the assembler code "LDCI @80H @08H" and the OpCode "C3 80 08". In step 36, a 16-bit value is retrieved from the register pair 08H identified by the source operand of the program instruction.

In decision step 37, it is again determined that the fetched OpCode corresponds to the program instruction LDCI. In decision step 38, however, it is determined that in this second execution of the program instruction LDCI the value retrieved from the register pair 08H equals sixteen zeros (0000H). The retrieved value 0000H is the incremented 16-bit value generated in step 43. In one embodiment, 8-bit ALU 17 determines whether the incremented 16-bit value equals 0000H. System 11 thereby effectively determines whether the 16-bit value FFFFH incremented in step 43 to 0000H has rolled over, without widening 8-bit ALU 17 to include a carry bit.

In a step 46, the 1-bit page-designation value stored in page bit 63 of memory page register 64 (MPR[0]) is toggled to generate a toggled 1-bit value. Thus, the digital zero that was present in page bit 63 since powerup of microcontroller 10 is toggled to a digital one. In step 46, system 11 changes the page designation while the program instruction LDCI is being executed. The page designation is changed without updating program counter 15 to fetch a separate processor instruction.

In a step 47, a memory address of a second constant is generated by prepending the toggled 1-bit value generated in step 46 to the incremented 16-bit value generated in step 43. The 17-bit memory address of generated in step 47 is "1 0000H".

In step 40, the second constant is retrieved from the memory location identified by the memory address "1 0000H" generated in step 47. In this example, the second constant is BCH, as shown in FIG. 4. FIG. 4 illustrates that a "block move" operation is being performed on a block of constants that straddle the boundary between program memory space 18 and expanded program memory space 19.

In step 41, processor 12 retrieves the destination file address from the register whose address is identified by the destination operand of the additional program instruction LDCI. The register 80H identified by the destination operand now contains the incremented destination file address 21H generated in step 45.

In the second iteration of step 42, the second constant BCH is written into the destination memory location identified by the incremented destination file address 21H, as indicated by a dashed arrow 67 in FIG. 4. Repeatedly executing the program instruction with the assembler code "LDCI @80H @08H" will load constants into register file memory space 14 from memory locations in program memory 13 having addresses that incrementally increase from the value FFFFH indicated by the source operand. The constants will be loaded into registers having addresses that incrementally increase from the value 20H indicated by the destination operand. A block move accomplished by repeatedly executing the program instruction LDCI is illustrated by a dashed arrow 68 in FIG. 4.

In step 43 of the second execution of the program instruction with the assembler code "LDCI @80H @08H", the 16-bit value 0000H in register pair 08H is incremented to generate the value 0001H. In step 44, processor 12 writes the value 0001H into register pair 08H identified by the source operand of the program instruction. In step 45, the destination file address located in the register identified by the destination operand is incremented from 21H to 22H.

The second execution of the program instruction LDCI is now complete, and processor 12 executes yet another instruction. Returning to step 30 a third time in this example, program counter 15 is updated by incrementing the 16-bit program counter value.

In step 31, a zero is prepended to the incremented 16-bit program counter value to generate a memory address of yet another program instruction. In step 32, processor 12 fetches the OpCode located in the next memory location of program memory space 18. In step 33, the OpCode is decoded. In this example, the OpCode located in the next memory location is "C2 7F 0A" and corresponds to the assembler code "LDC @7FH @0AH". The program instruction LDC loads a single constant from program memory 13 into register file memory space 14 and does not perform the incrementing that allows the "block move" and "table copy" operations.

In decision step 34, it is determined that OpCode "C2 7F 0A" corresponds to one of the program instructions LDC or LDCI. In step 35, processor 12 begins executing the program instruction with OpCode "C2 7F 0A". In step 36, a 16-bit value is retrieved from the register pair 0AH identified by the source operand of the program instruction "LDC @7FH @0AH".

Figure 5:
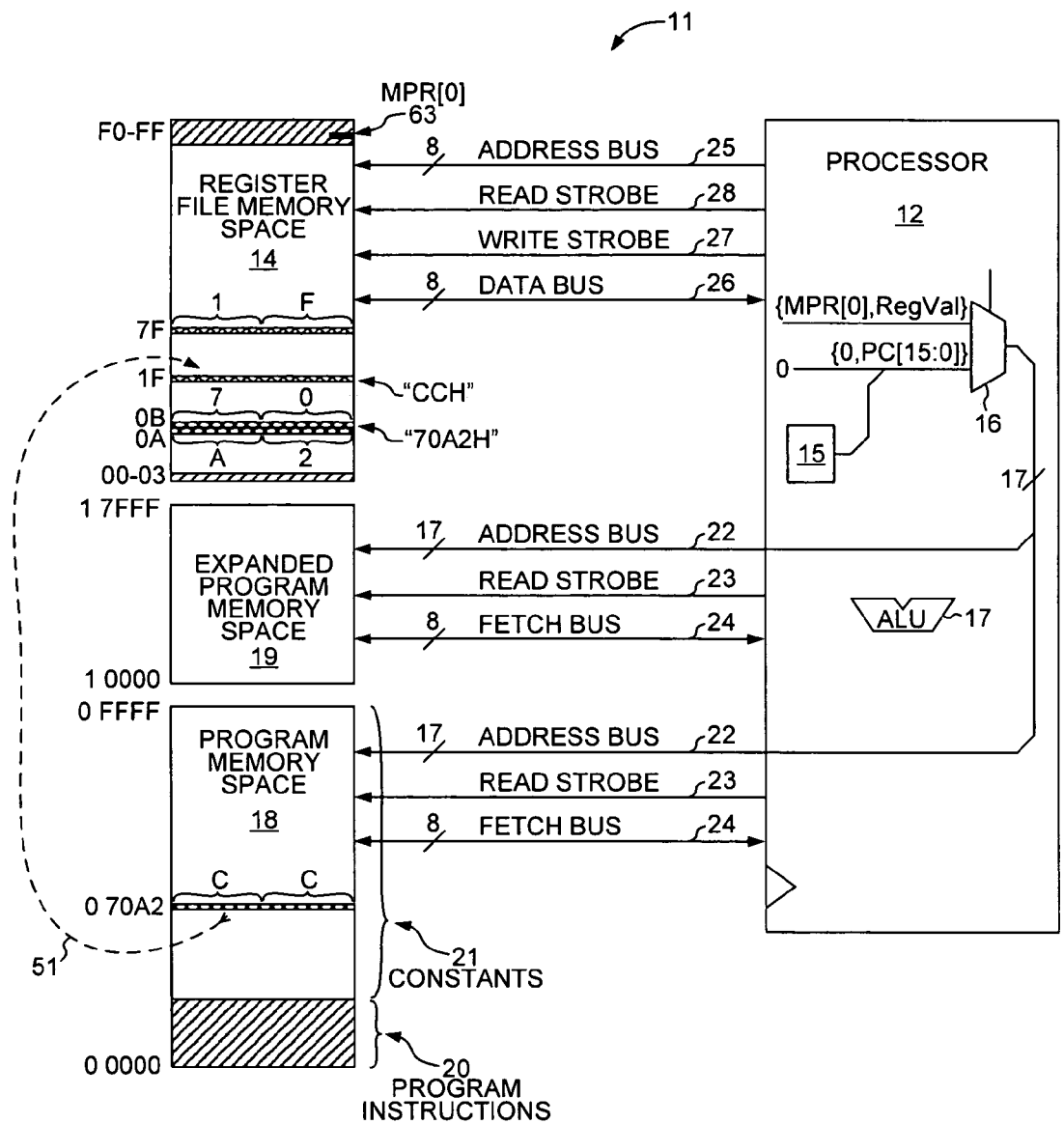
FIG. 5 is a simplified schematic diagram of a system that expands program memory when the processor instruction LDC is being executed.

FIG. 5 is a simplified schematic diagram of system 11 for expanding program memory illustrating the load operation of the program instruction for the assembler code "LDC @7FH @0AH". FIG. 5 shows that the 16-bit value retrieved in step 36 from the register pair 0AH is 70A2H. The 16-bit value 70A2H in register pair 0AH is stored as A2H in register 0AH and as 70H in register 0BH.

In decision step 37, it is determined that the fetched OpCode "C2 7F 0A" does not correspond to the program instruction LDCI.

A step 48 follows step 37 when it is determined that the fetched OpCode corresponds to the program instruction LDC instead of LDCI. In step 48, system 11 generates a 17-bit memory address of a third constant by prepending a 1-bit page-designation value to the 16-bit value 70A2H. The 1-bit value is retrieved from page bit 63 of memory page register 64, and the 17-bit memory address "0 70A2H" is generated designating a memory location in program memory space 18. In this example, the default value zero is present in page bit 63 because processor 12 has not been specifically programmed to find the third constant in expanded program memory space 19. Before retrieving a single constant or performing a block move operation from expanded program memory space 19, page bit 63 (MPR[0]) would be set to digital one. For example, page bit 63 would be set to digital one to perform a block move of a codeset that is entirely stored in expanded program memory space 19. Notwithstanding the foregoing, where a block move operation is performed using the LDCI instruction starting from the memory address "1 0000H", however, page bit 63 (MPR[0]) is allowed to remain a digital zero. In that case, the 1-bit page-designation value would be toggled to digital one because the 16-bit value would be 0000H.

In a step 49, the third constant CCH is retrieved from the memory location identified by the 17-bit memory address "0 70A2H" generated in step 48.

In a step 50, processor 12 retrieves the destination file address 1FH from the register whose address is identified by the destination operand 7FH of the program instruction for the assembler code "LDC @7FH @0AH". FIG. 5 illustrates that the destination file address 1FH is contained in the register 7FH of the register file memory space 14.

In a step 51, the third constant CCH is written into a destination memory location identified by the destination file address 1FH, as indicated by the dashed arrow in FIG. 5.

The execution of the program instruction LDC is now complete, and processor 12 executes yet another instruction. Returning to step 30 a fourth time in this example, program counter 15 is updated by incrementing the 16-bit program counter value.

In step 31, a zero is prepended to the incremented 16-bit program counter value to generate a memory address of yet another program instruction. In step 32, processor 12 fetches the OpCode of the instruction, and in step 33, the OpCode is decoded. In this example, the OpCode located in the next memory location is "02 11 12" and corresponds to the assembler code "ADD 11H, 12H".

In decision step 34, it is determined that OpCode "02 11 12" does not correspond to one of the program instructions LDC or LDCI. The program instruction with the OpCode "02 11 12" does not load a constant from program memory 13 into register file memory space 14. Instead, two constants already stored in register file memory space 14 are added. Thus, system 11 does not expand program memory 13 while the program instruction ADD is being executed.

In a step 52, processor 12 begins executing the program instruction with OpCode "02 11 12".

In a step 53, system 11 determines the memory location of a first register in register file memory space 14 identified by the destination operand 11H of the program instruction with OpCode "02 11 12".

In a step 54, a first value of eight bits is retrieved from the first register. In this example, the first value is 16H.

In a step 55, system 11 determines the memory location of a second register in register file memory space 14 identified by the source operand 12H of the program instruction with OpCode "02 11 12".

In a step 56, a second value of eight bits is retrieved from the second register. In this example, the second value is 20H.

In a step 57, system 11 performs the ADD operation on the first value and the second value. In this example, ALU 17 calculates the sum of 16H and 20H and obtains the result 36H.

In a step 58, processor 12 loads the result 36H into the first register identified by the destination operand 11H. The execution of the program instruction ADD is now complete, and processor 12 executes yet another instruction.

System 11 expands program memory 13 without requiring extensive modifications to microcontroller 10. By selectively expanding program memory 13 depending on which type of program instructions is being executed, system 11 allows 8-bit processor 12 to continue to manipulate 16-bit memory addresses in two passes of ALU 17.

System 11 allows more than 216 memory locations in program memory to be accesses without using more than two 8-bit registers in register file memory space to store each memory address of program memory. Although program memory 13 is addressed over 17-bit address bus 22, three 8-bit registers are not required to accommodate 17-bit memory addresses. Moreover, 16-bit program counter 15 need not be expanded to seventeen bits to select memory locations of program instructions over 17-bit address bus 22.

In addition, system 11 allows the speed of microcontroller 10 to be maintained with expanded memory because computations can continue to be performed on 16-bit memory addresses. ALU 17 need not manipulate the 17-bit memory addresses generated when system 11 prepends 1-bit page-designation values to 16-bit memory addresses. ALU 17 would require at least three passes to manipulate a 17-bit memory address. Although speed could also be maintained when manipulating longer memory address by widening ALU 17 and expanding bus widths throughout processor 12, such widening would consume more silicon area and would be costly. System 11 also obviates the need for a memory management unit to address an expanded program memory. A memory management unit would add additional cost to microcontroller 10.

System 11 allows existing microcode programs to run on microcontroller 10 and address expanded program memory space 19 without extensively modifying the programs. System 11 allows 16-bit program counter 15 to cycle through program instructions over 17-bit address bus 22 without requiring more clock cycles to convey the $17^{th}$ bit. In addition, existing microcode programs running on microcontroller 10 with system 11 need not be modified to pass memory addresses for expanded memory space through ALU 17 additional times to accommodate the page index of typical indexed addressing schemes.

Although the present invention has been described in connection with certain specific embodiments for instructional purposes, the present invention is not limited thereto. In the specific embodiments described above there are $2^N$ locations in program memory space 18, and an LDCI instruction can move constants from a memory location in a larger address space that includes the $2^N$ memory locations as well as an additional $2^N$ memory locations of expanded program memory space 19. An additional one bit of address is provided so that N+1 address bits are provided to make this access of the larger address space. The additional address bit is the value present in one predetermined bit of memory page register 64. Although the invention is described above in connection with one such additional address bit, page bit 63, the described technique is usable to provide multiple additional address bits, such as M bits. The values of M bits of memory page register 64 can be used as multiple additional address bits such that the larger address space is larger than the $2^{N+1}$ memory locations of the embodiments described above. The values in the bits of memory page register 64 can be toggled automatically in hardware such that the bits of the register form a small counter. Alternatively, the values in the bits can be read out of memory page register 64 by the processor, incremented using ALU 17, and then the incremented value written back into memory page register 64. Although the values in program memory 13 that are moved using the LDC and LDCI instructions are described above as constants, the values that are moved can be any digital values. For example, a block of instructions can be moved from one portion of memory to another by repeatedly executing the LDCI instruction in accordance with one embodiment of the present invention.

System 11 for efficiently expanding program memory has been described above in relation to a microcontroller in a remote control device. System 11 can also efficiently expand program memory in central processing units of other portable electronic devices, such as personal digital assistants (PDAs), cell phones, pagers, digital cameras, portable MP3 players and laptop computers. For example, system 11 can be used to expand program memory onto an identification chip of a GSM cell phone such that a block of constants can extend from the program memory of the cell phone's CPU onto an expanded program memory space defined on the identification chip. Although specific embodiments described above relate to a microcontroller with an 8-bit ALU, a 16-bit program counter and a 17-bit program memory address bus, system 11 is equally applicable to architectures with larger or smaller bit widths. For example, another embodiment of system 11 efficiently expands program memory in a microcontroller with a 16-bit ALU, a 24-bit program counter and a 25-bit program memory address bus. Accordingly, various modifications, adaptations, and combinations of various features of the described embodiments can be practiced without departing from the scope of the invention as set forth in the claims.

What is claimed is:

1. A method comprising:
   (a) fetching a program instruction from a memory space, wherein the memory space comprises a regular portion and an additional portion, wherein both constants and program instructions are stored in the regular portion and only constants are stored in the additional portion, wherein the regular portion has up to 2N unique memory locations, wherein the program instruction is indicative of an N-bit value corresponding to a first constant, wherein the first constant is located in a first memory location identified by a first memory address of N+M bits, wherein the first memory address is the N-bit value plus a prepended M-bit value;
   (b) retrieving the first constant from the first memory location;
   (c) incrementing the N-bit value such that the N-bit value rolls over;
   (d) toggling the prepended M-bit value; and
   (e) retrieving a second constant from a second memory location, wherein the second memory location is identified by a second memory address of N+M bits, wherein the second memory address is the incremented N-bit value plus the toggled prepended M-bit value.

2. The method of claim 1, wherein (b), (c) and (d) occur as a result of a first execution of the program instruction, and wherein (e) occurs as a result of a second execution of the program instruction.

3. The method of claim 1, wherein (b) and (c) occur as a result of a first execution of the program instruction, and wherein (d) and (e) occur as a result of a second execution of the program instruction.

4. The method of claim 1, wherein the first memory location is in the regular portion of the memory space, and wherein the second memory location is in the additional portion of the memory location.

5. The method of claim 1, wherein the additional portion has up to 2N unique memory locations.

6. The method of claim 1, further comprising:
   (f) fetching a second program instruction from the memory space, wherein the second program instruction corresponds to a second N-bit value, wherein the second program instruction is located in a third memory location identified by a third memory address of N+M bits, wherein the third memory address is the second N-bit value plus a second prepended M-bit value, wherein the second prepended M-bit value equals the prepended M-bit value.

7. The method of claim 6, wherein the second prepended M-bit value is constant.

8. The method of claim 1, further comprising:
   (f) updating a program counter to output an instruction memory address, wherein the program instruction is located in an instruction memory location identified by the instruction memory address, wherein the instruction memory location is in the regular portion of the memory space, and wherein the program counter has a width of less than or equal to N bits.

9. The method of claim 1, further comprising:
   (f) conveying the N-bit value to an arithmetic and logic operation unit (ALU) over an ALU bus, wherein the ALU bus has a width of less than or equal to N bits.

10. The method of claim 1, further comprising, after (b) and before (c):
    (f) conveying the N-bit value to an arithmetic and logic operation unit (ALU), wherein the ALU increments the N-bit value in (c).

11. The method of claim 10, wherein the prepended M-bit value is toggled in (d) after the ALU determines that the N-bit value rolls over upon the incrementing in (c).

12. The method of claim 10, wherein the ALU has a width of N/2 bits.

13. The method of claim 10, wherein the regular portion of the memory space, the additional portion of the memory space, and the ALU are on a single integrated circuit die.

14. The method of claim 1, wherein (a), (b), (c), (d) and (e) are performed on a single integrated circuit die.

15. The method of claim 1, further comprising:
    (f) writing the first constant into a destination memory location in a register file memory space, wherein a destination operand of the program instruction is indicative of the destination location, and wherein the prepended M-bit value is stored in a register of the register file memory space.

16. A computer-readable storage medium comprising program instructions for performing the steps of:
    (a) retrieving an N-bit value from a register pair located in a register file memory space, wherein the computer-executable instruction has a source operand and a destination operand, wherein the register pair has an address identified by the source operand, wherein the destination operand identifies an address of a register in the register file memory space containing a destination file address of a destination memory location, wherein the N-bit value corresponds to a memory location of a first constant in a program memory space, wherein the program memory space comprises a regular portion and an additional portion, wherein the regular portion has up to 2N unique memory locations, wherein the memory location of the first constant is in the regular portion;
    (b) generating a first memory address of the first constant by prepending an M-bit value onto the N-bit value;

(c) retrieving the first constant from the memory location of the first constant identified by the first memory address;

(d) writing the first constant into the destination memory location;

(e) incrementing the N-bit value to generate an incremented N-bit value;

(f) toggling the M-bit value to generate a toggled M-bit value only if the incremented N-bit value equals N zeros; and (g) generating a second memory address of a second constant by prepending the toggled M-bit value to the incremented N-bit value, wherein the second memory address identifies a memory location of the second constant in the program memory space, wherein the memory location of the second constant is in the additional portion.

17. The computer-readable storage medium of claim 16, further comprising, after (e) and before (f):

(f) determining whether the incremented N-bit value equals N zeros.

18. The computer-readable storage medium of claim 16, wherein both constants and program instructions are stored in the regular portion, and only constants are stored in the additional portion.

19. The computer-readable storage medium of claim 16, further comprising:

(h) retrieving the second constant from the memory location of the second constant;

(i) generating an incremented destination file address by incrementing the destination file address in the register whose address is identified by the destination operand; and (j) writing the second constant into a second register identified by the incremented destination file address.

20. The computer-readable storage medium of claim 16, wherein the incremented N-bit value generated in (e) is loaded into the register pair.

21. The computer-readable storage medium of claim 16, wherein the M-bit value is toggled in (f) without fetching an additional computer-executable instruction and without additionally incrementing a program counter.

22. The computer-readable storage medium of claim 16, wherein the first memory address has N+M bits.

23. A system comprising:

(a) a memory space comprising a regular portion and an additional portion, wherein the regular portion has up to 2N unique memory locations;

(b) an address bus that addresses the memory space, wherein the address bus is N+M bits wide;

(c) a program counter that is N bits wide;

(d) a register file memory space comprising a source register pair and a memory page register; and (e) a multiplexer with a first data input lead, a second data input lead and an output lead, wherein each of the first data input lead, the second data input lead and the output lead is N+M bits wide, wherein the output lead is coupled to the address bus, wherein a page bit of the memory page register is coupled to a most significant bit of the first data input lead, wherein the source register pair is coupled to the first data input lead, wherein the program counter is coupled to N least significant bits of the second data input lead, wherein the multiplexer couples the first data input lead to the output lead when a first program instruction is being executed, wherein the multiplexer couples the second data input lead to the output lead when a second program instruction is being executed, wherein the first program instruction has a source operand that identifies an address of the source register pair.

24. The system of claim 23, wherein the address bus addresses only the regular portion of the memory space when the second data input lead of the multiplexer is coupled to the output lead of the multiplexer.

25. The system of claim 23, wherein a fixed digital value is present on a most significant bit of the second data input lead.

26. The system of claim 23, wherein the regular portion of the memory space contains both program instructions and constants, and wherein the additional portion of the memory space contains only constants.

27. The system of claim 23, further comprising:

(f) an arithmetic and logic operation unit (ALU), wherein a digital value is stored in the source register pair, wherein the ALU calculates an incremented digital value by incrementing the digital value stored in the source register pair, and wherein the ALU determines whether the incremented digital value equals zero.

28. The system of claim 27, wherein the page bit of the memory page register is toggled when the ALU determines that the incremented digital value equals zero.

29. The system of claim 27, wherein the ALU has a width of less than or equal to N bits.

30. A system comprising:

(a) a memory space comprising a regular portion and an expanded portion, wherein the regular portion contains both program instructions and constants and the additional portion contains only constants, and wherein the regular portion has up to 2N unique memory locations;

(b) an address bus that addresses the memory space, wherein the address bus is N+M bits wide;

(c) a program counter that is N bits wide, wherein a first program instruction and a second program instruction are fetched, and wherein the first program instruction loads a constant; and (d) means for addressing the expanded portion of the memory space only when the first program instruction is being executed and for addressing only the regular portion of the memory space when the second program instruction is being fetched.

31. The system of claim 30, wherein a constant digital value is present on a most significant bit of the address bus when the first program instruction and the second program instruction are being fetched.

32. The system of claim 30, wherein the means toggles a page bit of a memory page register while the first program instruction is being executed.

* * * * *

UNITED STATES PATENT AND TRADEMARK OFFICE
CERTIFICATE OF CORRECTION

| | |
|---|---|
| PATENT NO. | : 7,269,710 B1 |
| APPLICATION NO. | : 10/898704 |
| DATED | : September 11, 2007 |
| INVENTOR(S) | : Stephen H. Chan |

It is certified that error appears in the above-identified patent and that said Letters Patent is hereby corrected as shown below:

The claim term "2N" should be changed to "$2^N$" in column 11, line 39, column 12, lines 2 and 63, column 13, line 48, and column 14, line 39.

Signed and Sealed this

Twenty-seventh Day of November, 2007

JON W. DUDAS
*Director of the United States Patent and Trademark Office*